Dec. 25, 1934.  H. LINDENBERGER  1,985,377
PURIFIER FOR DRY CLEANING APPARATUS
Filed July 30, 1932
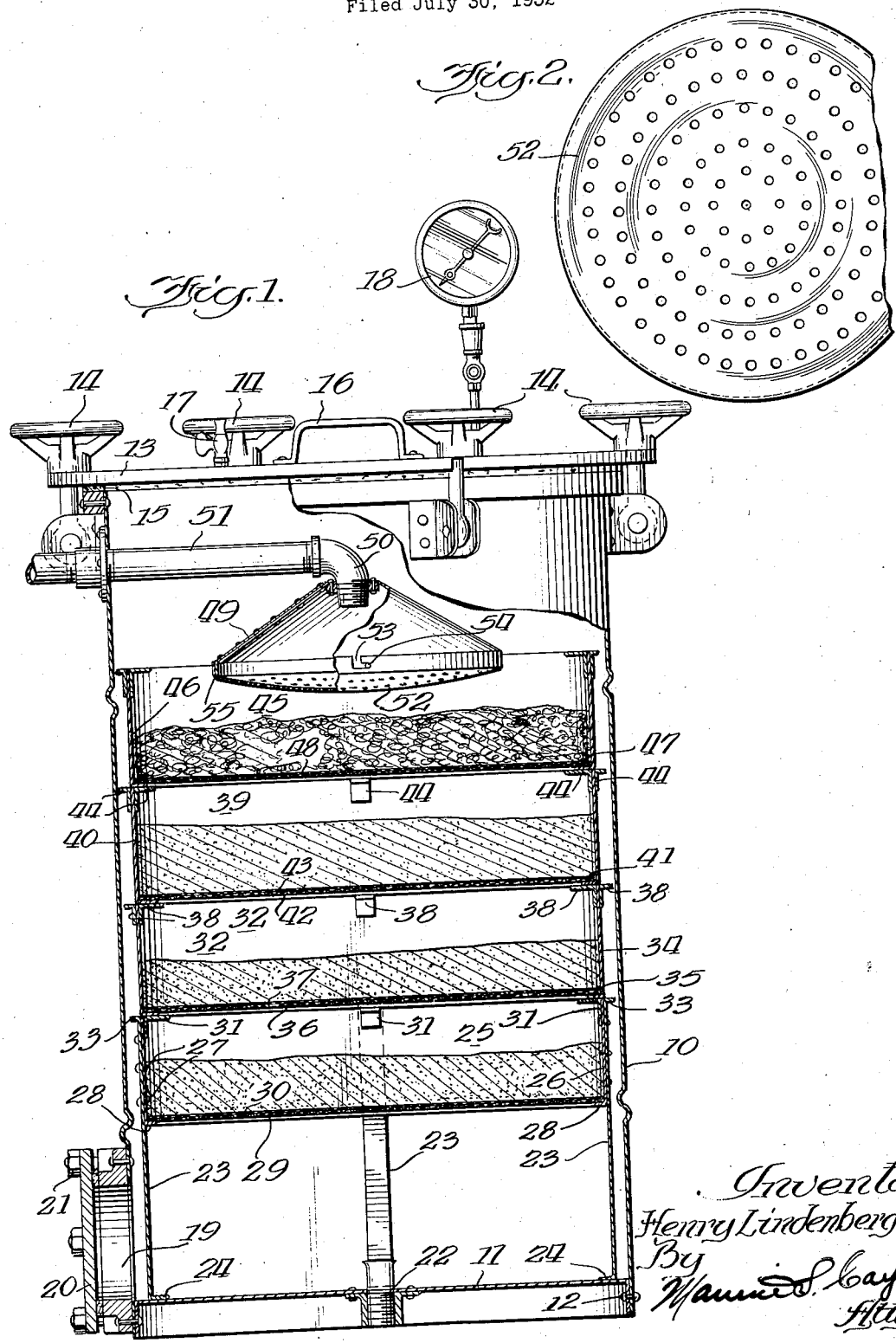
Inventor
Henry Lindenberger
By
Atty.

Patented Dec. 25, 1934

1,985,377

UNITED STATES PATENT OFFICE 1,985,377

PURIFIER FOR DRY CLEANING APPARATUS

Henry Lindenberger, Chicago, Ill.

Application July 30, 1932, Serial No. 626,743

1 Claim. (Cl. 210—134)

This invention relates to dry cleaning equipment and has for its principal object the provision of a simple and efficient purifying mechanism, which will effectively clarify and purify the solvent used for cleaning, so that the same may be continuously re-used.

The construction of dry cleaning apparatus within which my improved purifier is particularly adapted for use is fully disclosed in my copending application bearing Serial No. 626,744 and filing date of July 30, 1932.

Another object of the invention is to construct the mechanism which goes to make up the purifying tank so that its several parts can be examined, renewed, changed, cleaned and so on without it being necessary to shut down the washing or dry cleaning system.

A further object of this invention is to provide a novel and improved purifying mechanism for effectively purifying the solvent used in dry cleaning apparatus, said mechanism including a spray through which the dirty solvent is sprayed, and including a plurality of super-imposed screened baskets through which the solvent is forced to pass before reaching the discharge end of the purifying tank.

A still further object of this invention is to provide a purifying tank for use in a dry cleaning equipment, said tank comprising a plurality of supports, whereby a plurality of different mesh screens may be arranged within said tank, one above the other, and a spray disposed in the upper end of said tank adapted for spraying the dirty solvent into said tank to force the same to pass through said screens before reaching the discharge end of said tank.

A still further object of this invention is to provide a purifying tank for dry cleaning equipment, which will be economical to construct and assemble, which may be readily disassembled for examination or changing or cleaning of parts, and which will be highly efficient for carrying out the purposes for which it is designed.

With the foregoing and other objects in view, which will appear as the description proceeds, the invention consists in certain novel features of construction, arrangement and combination of parts, hereinafter more fully described, illustrated in the accompanying drawing and particularly pointed out in the appended claim, it being understood that various changes in the form, proportion, size and minor details of the structure may be made without departing from the spirit or sacrificing any of the advantages of the invention.

For the purpose of facilitating an understanding of my invention, I have illustrated in the accompanying drawing a preferred embodiment thereof, from an inspection of which, when considered in connection with the following description, my invention, its mode of construction, and many of its advantages should be readily understood and appreciated.

Referring to the drawing in which similar characters of reference are employed to indicate corresponding parts throughout the several figures of the drawing:—

Figure 1 is a vertical section through a purifying tank embodying the principles of my invention; and Figure 2 is a bottom plan view of the spraying means through which the dirty solvent is discharged into the purifying tank.

In the embodiment illustrated, the purifying tank comprises the outer shell 10, which may be constructed of any suitable material, said shell having the bottom end thereof closed by the plate member 11, which plate member is rigidly secured thereto in any suitable manner, such for example as by means of the rivets 12 or the like. The top of the shell 10 is closed by a suitable cover member 13, by means of the locking members 14, there being interposed a gasket 15 between the cover member 13 and the upper edge of the shell 10. A handle 16 is provided on the cover member 13 to facilitate the handling of the same. A pet cock 17 is provided on the cover member 13 and a pressure gauge 18 is also provided thereon. By means of the above construction the shell 10 is suitably sealed when in operative condition.

A clean out opening 19 is provided adjacent the lower end of the shell, said opening being closed by a suitable member 20, held in place by means of the bolts 21. In the bottom plate member 11 is provided an outlet 22, through which the liquid received in the bottom of the shell 10 may be discharged to a desired point in the dry cleaning system.

The purifying tank as already explained is adapted particularly for use in a dry cleaning equipment using carbon tetra chloride as a solvent. In actual operation the solvent is discharged from the washer (not shown) to the purifier tank, through which the solvent is adapted to pass, the said solvent then being again forced to flow to the washer where it may again be used for cleaning purposes.

Disposed within the shell 10 are a plurality of baskets disposed one above the other, said baskets being provided with suitable screened bottoms, and arranged in a manner to be now more fully described.

Disposed on the bottom plate member 11 are a plurality of upstanding supports 23, the bottom edges of which are bent inwardly to form the feet 24, which rest upon the plate member 11, and to the upper portions of which is secured the basket 25, said basket comprising an annular member 26, which is rigidly secured, such for example as by means of the rivets 27, to the inner upper portions of the upstanding members 23. The bottom edge of the annular member 26 is bent inwardly as at 28, to form an annular inwardly extending flange, which is adapted to support in operative position the screens 29 and 30. In practice, the screen 29 is a 4-mesh screen of .047 galvanized iron, and the screen 30 is an 80-mesh screen of Monel metal. Disposed adjacent the upper edge of the annular member 26 are a plurality of angle bars 31, which are rigidly secured, such as by soldering or the like, to the said member 26, said angle bars 31 forming a support for the basket 32 to be disposed thereon. The upper free edges of the supports 23 are also provided with outwardly extending flanges 33, as shown in Figure 1 of the drawing.

The basket 32 is constructed in a manner similar to that of the basket 25, said basket 32 comprising an annular member 34, the bottom edge of which is bent inwardly to form the annular inwardly extending flange 35, which is adapted to rest on the supports 31, and which supports the screens 36 and 37 in their operative position. The screen 36 is similar in construction to the screen 29, and the screen 37 is a 70-mesh screen of Monel metal. Provided adjacent the upper free edge of the annular member 34 of the screen 32 are the inner and outer angle bars 38, which are secured to the member 34 in any suitable manner, such as by soldering or the like, said members being provided for supporting the next adjacent basket disposed thereon.

This next basket 39 comprises the annular member 40, the bottom edge of which is turned inwardly to form the annular inwardly extending flange 41, which rests upon the supports 38 and which is adapted to support in operative position the screen members 42 and 43. The screen member 42 is of similar construction to that of the screen member 29, whereas the screen member 43 is a 60-mesh screen of monel metal. Adjacent the upper edge of the annular member 40 are provided the supporting brackets 44 on both the inside and outside of said member 40, which supporting brackets are adapted to support the next adjacent basket 45 disposed above the basket 39.

As shown in Figure 1 of the drawing, the basket 45 comprises the annular member 46, the bottom edge of which is turned inwardly to form the annular inwardly extending flange 47 which rests upon the brackets 44, and which is adapted to support in operative position the screen member 48. In this basket the screen member is a 4-mesh screen of .047 galvanized iron. As shown in the drawing, the baskets 25, 32, 39 and 45 are disposed one upon the other and when in operative position the upper basket 45 is spaced from the upper edge of the shell 10.

In the space directly above the upper basket 45 is disposed a spraying unit 49, said unit being threaded on the elbow 50, which connects with a pipe 51, leading from the washer (not shown). The dirty liquid from the washer enters the pipe 51 and is discharged through the elbow 50 into the member 49, which may be of any suitable shape, such for example as that shown in Figure 1, and the bottom end of said member 49 is closed by a spray head 52, which spray head is adapted for detachable engagement with the member 49 by means of the bayonet slot 53 provided therein and the pin 54 which cooperates with said bayonet slot.

As shown in the drawing, the member 49 terminates in its lower edge in a depending flange 55, over which the spray head 52 is adapted to fit. When in fully assembled position the spray 49 is disposed directly above the upper basket 45 so that the solvent issuing from said spray will drop into said basket.

To accomplish the clarifying and purifying of the fluid or solvent discharged from the spray 52, there is disposed a mass of cotton batting in the upper basket 45, and a quantity of calcium in the lower baskets 39, 32 and 25. The passage of the solvent through the cotton batting and the three layers of calcium will be effective in clarifying the solvent, as well as taking out all of the moisture from the solvent, the latter being accomplished by the solvent passing over the layers of calcium. The clear solvent will drop into the bottom end of the shell 10, from which it may be drawn up through the outlet 22 and directed to the desired point of the dry cleaning system for reuse.

From the above it will be readily apparent that easy access may be had to the inside of the purifying tank by merely removing the cover member 13, at which time the spray head 49 may be readily removed from the elbow 50 for cleaning the same. Also the provision of the bayonet slot connection between the spray head and the spray 52 will permit readily removal of the said spray 52 for cleaning out the same from time to time. It will also be apparent that the disposition of the baskets one above the other will make it possible to readily remove the same whenever it is desired to change the contents thereof. In practice, however, it will only be necessary to change the cotton batting about once every week or ten days, which may be accomplished by merely removing the cover plate 13. The necessity for changing the calcium disposed in the other baskets will not arise very frequently as the same may be used for a period of six months or longer with highly satisfactory results.

It is believed that my invention, its mode of construction and assembly, and many of its advantages should be readily understood and appreciated from the foregoing without further description, and should also be manifest that while a preferred embodiment of the invention has been shown and described for illustrative purposes the structural details are, nevertheless, capable of wide variation within the purview of my invention as defined in the appended claim.

What I claim and desire to secure by Letters Patent of the United States is:—

A filter comprising a tank closed at its bottom and open at its top, a removable closure member for the open top of said tank, a plurality of baskets disposed in said tank arranged one above the other, each of said baskets having a screened bottom and a solid annular wall, the bottom of said baskets being provided with legs secured thereto for supporting the same in spaced relation with the bottom wall of the tank, means provided adjacent the free edge of each of said baskets for supporting thereon the next adjacent basket, said means including angular bars rigidly secured to the annular wall of the basket to form inwardly extending projections upon which the next adjacent basket is adapted to rest, an inlet for said tank provided adjacent the upper end thereof and a spray connected with said inlet, said spray being disposed at a level below that of the upper free edge of the uppermost basket, whereby the liquid emitted through said spray will be received in said upper basket, cotton batting disposed within said upper one of said baskets, a moisture absorbing means disposed within the other of said baskets.

HENRY LINDENBERGER.